Figure 1:
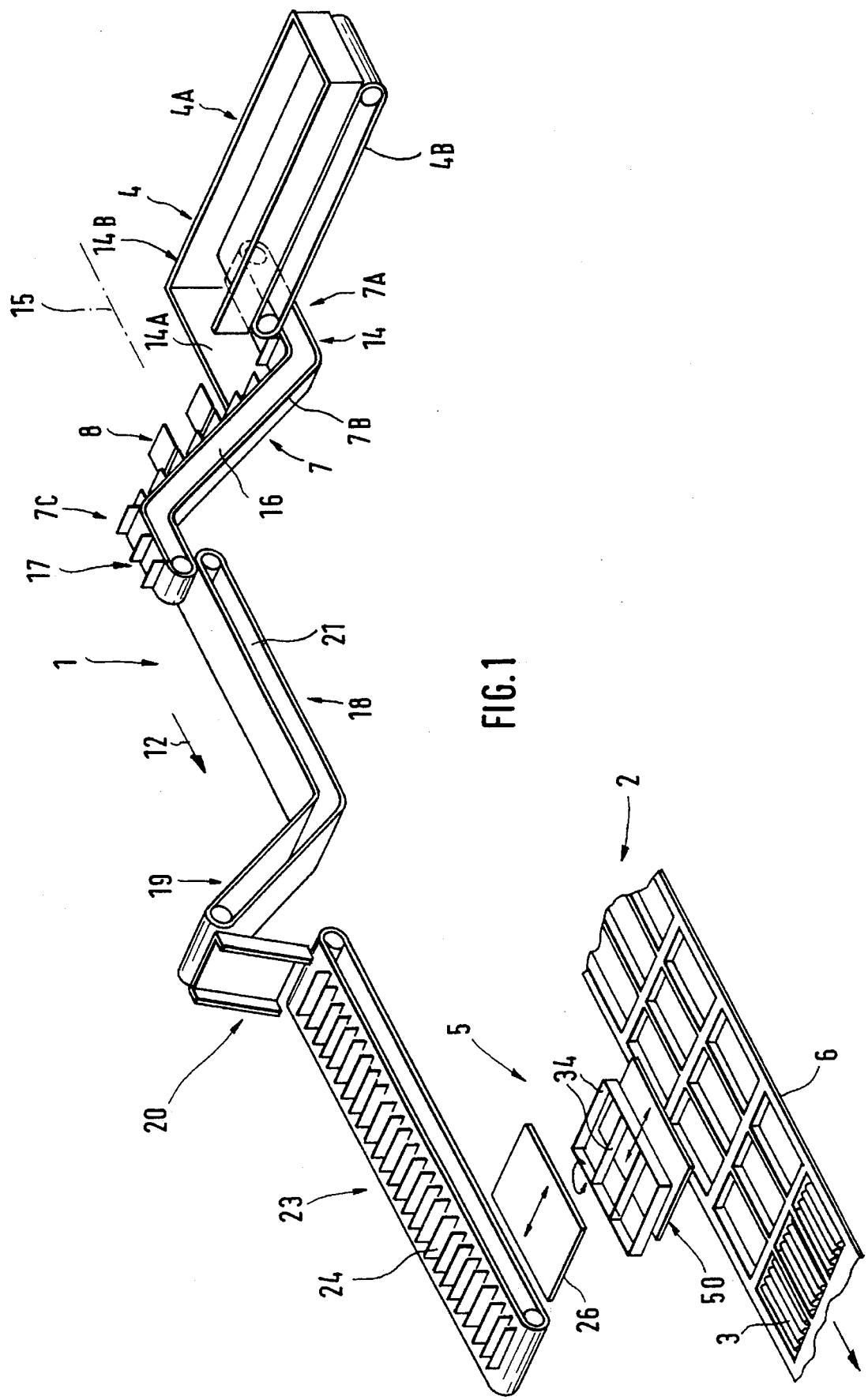

United States Patent [19]

Krewer

[11] Patent Number: 5,575,712
[45] Date of Patent: Nov. 19, 1996

[54] DEVICE FOR MACHINE

[76] Inventor: Lars Krewer, Sländgatan 15, S-451 62 Uddevalla, Sweden

[21] Appl. No.: 392,760

[22] PCT Filed: Aug. 19, 1993

[86] PCT No.: PCT/SE93/00689

§ 371 Date: Feb. 22, 1995

§ 102(e) Date: Feb. 22, 1995

[87] PCT Pub. No.: WO94/04417

PCT Pub. Date: Mar. 3, 1994

[30] Foreign Application Priority Data

Aug. 24, 1992 [SE] Sweden ...................... 9202436

[51] Int. Cl.$^6$ ........................... A22C 17/00; B65B 5/08
[52] U.S. Cl. .................... 452/177; 53/236; 53/251
[58] Field of Search ............................ 452/177, 181, 452/184, 51; 53/236, 251, 148, 152, 544, 539, 143; 198/418, 418.1, 418.2, 418.5, 418.6, 418.7, 419, 431; 426/392

[56] References Cited

U.S. PATENT DOCUMENTS 2,948,093  8/1960  Bonami .......................... 53/236
3,105,337 10/1963  Clanin et al. .................. 53/251
4,800,703  1/1989  Goodman ....................... 53/251
5,005,339  4/1991  Capawana ....................... 53/236
5,102,368  4/1992  Strasser et al. ................ 452/177

FOREIGN PATENT DOCUMENTS 465759  5/1937  United Kingdom .

Primary Examiner—Willis Little
Attorney, Agent, or Firm—Dvorak and Traub

[57] ABSTRACT

The present invention refers to a device for a machine for handling of sausage between a sausage feeder and a delivering device for sausage to a package with a conveyor operating between the feeder and the delivering device. According to the invention a number of flaps are located above the conveyor divided by carriers into compartments. The flaps are arranged to extend substantially in line with passing carrier and forming an extension of the same. The functions of the flaps is to act on sausage to be directed in said compartment before delivering of the sausage to packing.

6 Claims, 3 Drawing Sheets

DEVICE FOR MACHINE

The present invention refers to a device for a machine for handling of sausage between a sausage feeder and a delivering device for sausage to packing, with a conveyor operating between the feeder and the delivering device.

Known machines that can transport and position sausage of longish type, for instance so called hot dogs of various kind, from a depository at a receiving location of a machine on a conveyor intended for this to be transferred to packing of the sausage has been complicated, staff demanding and not so effective. The sausage thereby also might be damaged and come into positions which has rendered the transport of the same more difficult.

Therefore, the main object of the present invention is at first hand to achieve a device, which solves said problem with simple and well operating means, and by this among other things make the handling of sausage more effective before packing of the same, such as for instance to arrange, count and put in order sausages with equal diameter in an appropriate compartment of a conveyor and at a package intended package of a packing machine, whereby among other things a large amount of personnel can be set free for other tasks.

Said object is accomplished by means of a device according to the present invention, which is mainly characterized therein, that a number flaps are located above the upwards inclined sorting conveyor by carriers divided into compartments, extending substantially in line with passing carriers and forming an extension of the same, arranged to actuate a sausage to be directed in said compartment before delivery of the sausage to packing and preferably that a carrier conveyor provided with transverse walls, which is divided into sausage receiving compartments and cooperative with a receiving part operating under the same, dividing into packing distances, which receiving part is movable for delivery of sausages received thereon to intended packing part, has the transverse sausage compartment dividing walls of the carrier conveyor extending to an active height below the diameter of a sausage so that said carrier wall draws a sausage dropped down lowest in the sausage depository, which ends in the area above said carrier conveyor.

Figure 2:
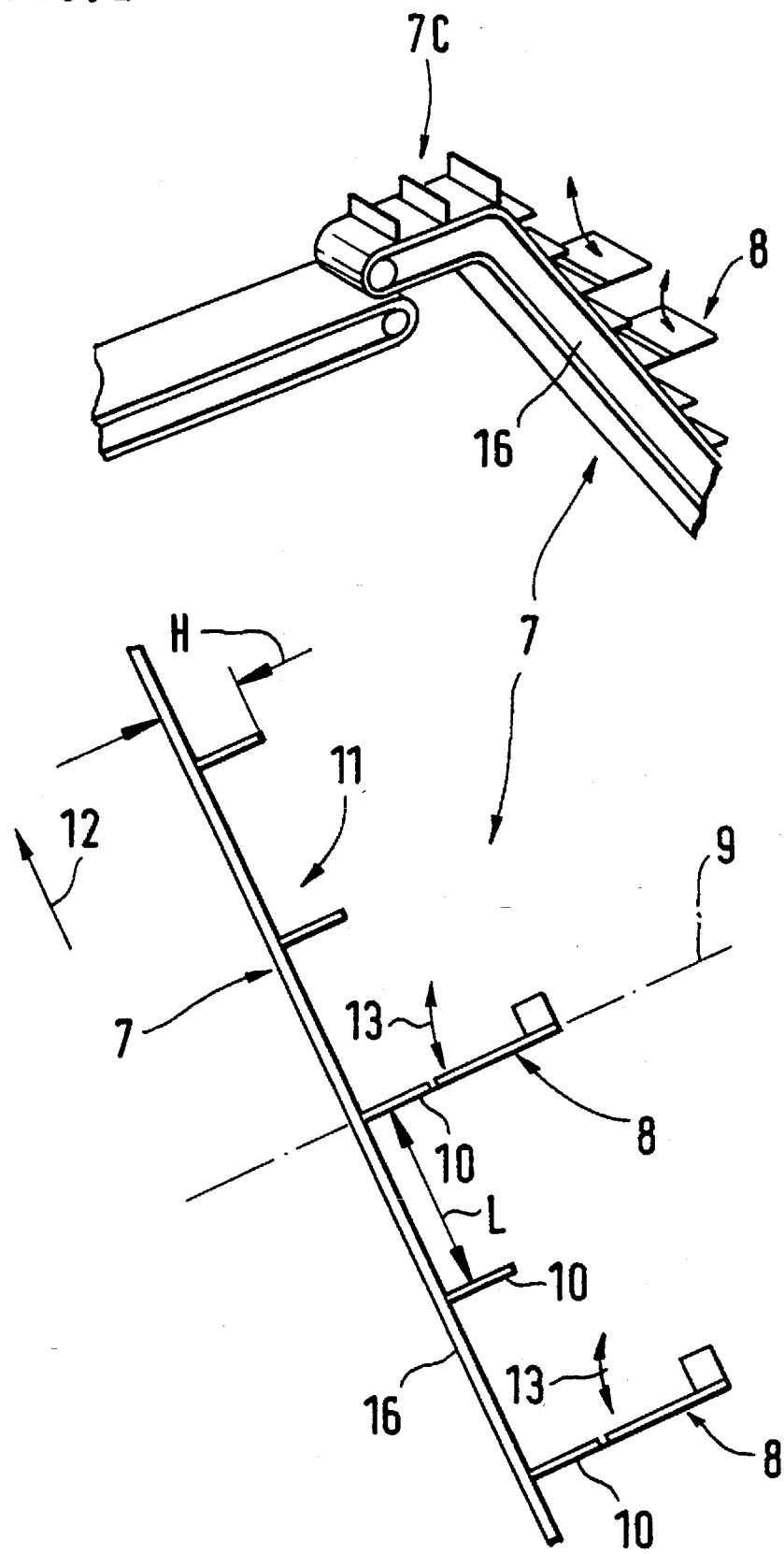
Figure 3:
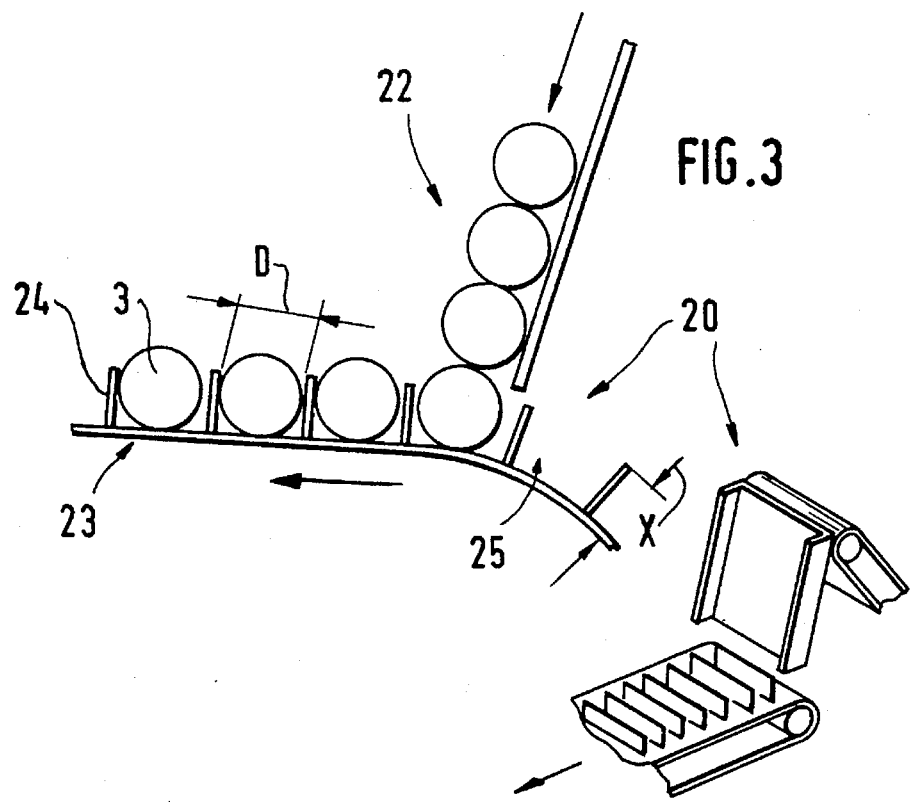
Figure 4:
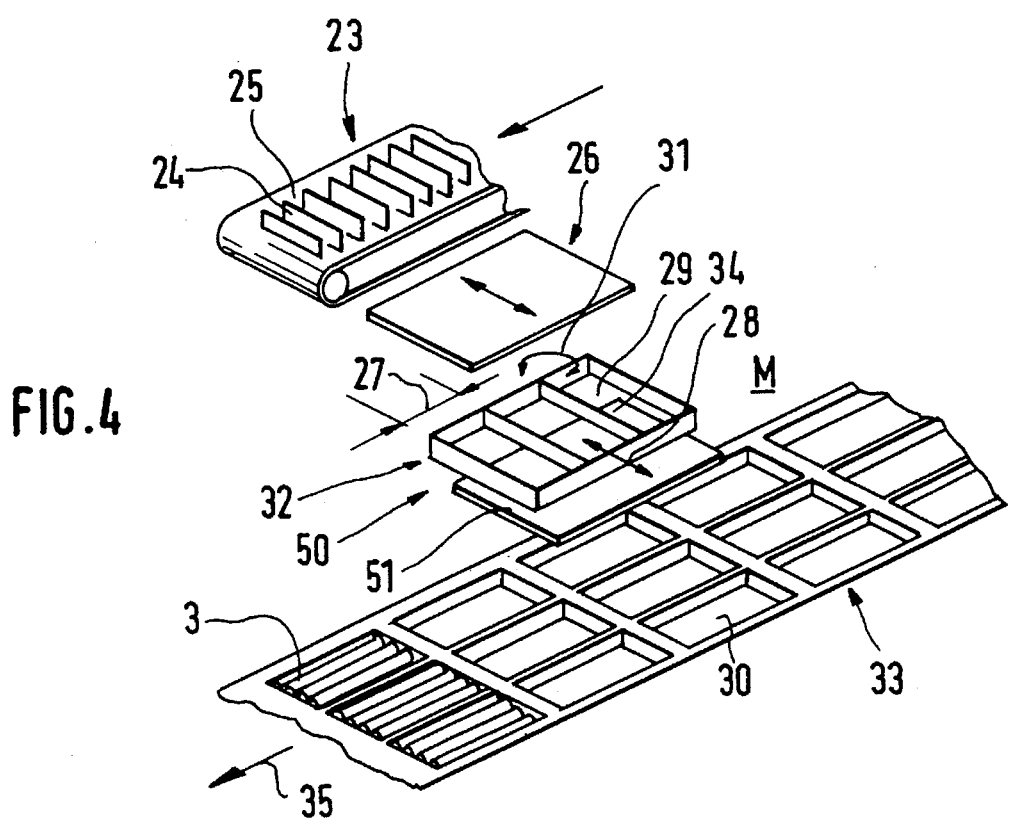

The invention is described in the following as a preferred embodiment, whereby is referred to the appended drawings, on which FIG. 1 diagrammatically shows a machine for handling of sausage between a feeder and a delivering device for sausage to packing, FIG. 2 shows a part of the machine, namely a haulage conveyor with cooperating sausage positioner, FIG. 3 shows a further part of the machine, in particular an outputting sausage depository, and FIG. 4 shows a sausage delivering device at a packing device.

A device 1 for a machine 2, which is intended for handling of elongated sausages 3, such as e.g. hot dogs or similar sausage which is transported between a sausage feeder 4 and a delivering device 5 for sausage 3 to be packed in a suitable package 6, is provided to be applicable to function at a conveyor 7, which operates between said sausage feeder 4 and sausage delivering device 5.

The sausage feeder 4 may be constituted by a trough 4A with a conveyor 4B at the bottom of the same in order to output sausage 3 after filling of sausage 3 therein further to packing and thereby owing to its volume operate as a buffer depository for sausage 3.

According to the invention a number of flaps 8 are located in a row after each other above said conveyor 7. Said flaps 8 are arranged to extend essentially in line 9 with carriers 10, which are situated on the up-conveyor 7, for dividing of this into a number of compartments 11, when the conveyor 7 with the carriers 10 pass in the transport direction 12. Said flaps 8 are provided to form an extension of carriers 10 when these pass the flaps 8, for instance as is shown in FIG. 2, with said flaps 8 provided resilient by the material in itself or journalled pivotable in direction 18 between said line extension 9 and folded-up position along the transport direction 12.

Said flaps 8, or other means with equivalent function, are arranged to be able to act on sausage 3, which is transported by the conveyor 7 operating as a sorting device, to be positioned in said associated compartment 11 before delivery of the sausage 3 to subsequent handling and packing of sausage 3.

Said sorting conveyor 7 may consist of a belt with carriers 10 distributed along the belt with relatively large division L, so that several sausages 3 simultaneously may be received in respective compartment 11. At the input end 7A of the conveyor 7 a transport part 14 may be provided, which has no or small inclination with respect to a horizontal plane 15. This transport part 14 can be surrounded by high edges 14A to form a transport trough 14B, to which sausage is portioned from the sausage feeder trough 4A via its conveyor 4B. The level in said transport trough 14B of the transport part 14 is thus provided to control the feeding of sausage from the feeding trough 4A operating s a buffer to the transport trough 14B.

Said flaps 8 are preferably provided to operate above the steeply upwards inclined, for instance with about 60°, versus the horizontal plane 15 ascending mid part 16 at the mid portion 7B of the sorting conveyor 7. The function of the flaps 8 and its cooperation with the sorting conveyor can be according to the following: When the sausages 3 are transported uphill the slope with the inclined transport midpart 16 of sorting conveyor 7 an automatic correction of the direction of the sausages occurs, so that they settle perpendicularly versus transport direction 12. It works such that the height H and the division L on the carriers 10 in combination with the tilt of the conveyor part 16 causes the sausages being located in the wrong direction to fall back down into the transport trough 14B or to the rear side of the resilient flaps 8, where they have to restart. Moreover the number of sausages that stick in each compartment 11 may vary considerably.

A machine 2 may be provided with one or several sorting conveyors 7, which are fed from a common buffer conveyor 4B depending on how large the capacity is of a packing machine 2 in use.

At the outlet end 7C of the sorting conveyor 7 there is provided a terminating transport end part 17, which as well as the input end of the conveyor 7 can show small or no inclination with respect to the horizontal plane 15.

Said sorting conveyor 7 with its transport end part 17 joins above an intermediate conveyor 18, which in turn can be provided with an end part 19 extending upwards, which ends to a sausage depository 20.

The intermediate conveyor 1B, in order to prevent sausages which are transported thereon to fall backwards down from said end part 19, is provided with low carriers directed transversely of the transport direction 12 and sparsely set out.

Said intermediate conveyor 18 according to the above mentioned may be provided to be fed with sausage from one or several sorting conveyors 7 and when the sausages at first are delivered to the plan part 21 of the intermediate conveyor they have a relatively good orientation perpendicular to the transport direction 12. However, a manual work effort is required to correct the sausages transported at most disorder on said conveyor 18, and to sort away any broken and defect sausages, when the sausages are transported along the plan part 21 of the conveyor 18.

The sausage depository 20 i s arranged to operate as a small buffer in the production and is arranged attachieve a pile 22 with sausage 3 and of this acting pressure downwards towards a carrier conveyor 23 connecting beneath. The level of this depository 20 thus varies with consumption and supply that is, how much sausage that is transported away from the depository 20 by said carrier conveyor 23 respectively how large quantity of sausage that is supplied to the depository 20. However, if the packing machine 2 shall be able to operate satisfactory, the depository should not be allowed to become completely empty during normal production. Means in the form of control means may be present to solve said problem and be provided to control the conveners 7, 18 respectively 23 before respectively after the depository 20.

The finally located carrier and output conveyor 23 may be provided with transversely to the transport direction 12 closely located walls 24, which divide the conveyor 23 designed preferably as a conveyor belt into compartments containing only one sausage 3 at a time.

The transverse sausage compartment divided walls 24 of the carrier and output conveyor preferably exhibit such an active height X, that it is below the diameter D of a sausage. By this each carrier wall 24 drags along a sausage 3 which has dropped down at the bottom of the sausage depository 20, so that it is received in a suitable receiving compartment 25 of the conveyor 23 at its continued transport in the running direction 12 for delivery at the bottom side of the conveyor along its longitudinal direction.

A sausage receiving part 50 acting under said conveyor which preferably is arranged to receive thereon supplied sausages 3 at appropriate packing distance 27. The sausage receiving part 50 is provided to be either permanent and operate only over the area at which it is located, or to be movable laterally, e.g. journalled pivotable 31 to desired position or displaceable laterally 28, in order to be able to locate and thereafter deliver on said part 51 in appropriate package groups 29 received sausages 3 to an intended package part 30 situated below, after possible necessary e.g. swing/displacement in a swing direction 31/laterally 28 of the sausage receiving part 50.

Since said sausage receiving part 50, which for instance can be designed as a plate 51, is provided to be able to open, e.g. to be movable laterally 28 along a substantially horizontal plane 15 with rapid movement, sausages collected thereon with correct number and preferably in correct number of groups. which is adapted to the package part fed underneath, e.g. a web 33 of deep drawn plastic sheeting, can be let down in package recesses 30 formed therein. Guiding and control of sausage collection can be achieved by means of counters not shown and described in detail and drive means of the conveyor 23 respectively a collecting part 26, which as well can be constituted by a laterally 28 movable plate.

A possibility to collect sausage in package adapted groups 29 is to let the conveyor 23 count and feed forward the correct number of sausages 3 above underneath resting collecting part 26. Separate stops can be arranged to assist at sausage group formation, e.g. that a number of movable transverse bars are present between the conveyor 23 and the receiving part 50, so that groups 29 with correct number of sausages are formed. Said group forming stop may be formed by cross bars 34 provided for instance by a group pattern frame 32.

The bottom forming receiving part 50 since its bottom plate 51 can be opened e.g. displaceable in lateral direction, arranged such that in a group 29 collected sausages 3 thereon can be let down in appropriate packing compartments 30 for the intended package.

Since there may be a number of compartments 30 with different patterns, e.g. several side by side, transverse sausage receiving spaces, length extended sausage receiving spaces, directly below located compartments, laterally displaced compartments that can be fed forward, of a packing machine 2, one or several as sinking units operating receiving parts 50 are required, which also can be provided by a moving unit, e.g. a turning device, in order to be able to correctly distribute the sausages to be positioned directly above respective compartment 30 before subsequent opening of a sausage receiving bottom 51 for dropping of the sausage in the packing compartments 30 and subsequent covering by a plastic material foil and cutting to separate packages and its further handling.

The material path 33 divided into compartments should in the drawings in FIG. 1 and 4 has compartments 30 placed three and three transversely to running direction 35 of the path. Thus a rotation is required of the sausage laterally before lowering down of this in package compartments 30. A sausage receiving part 50 rotatable e.g. about a vertical pivot axis described above is therefore required to turn the sausage into correct packing direction. Said part 50 is therefore preferably pivotably journalled 31 between a receiving position M, which is shown in the drawings, and a laterally turned delivering position which however is not shown in the drawings.

The task of the invention is thus to make packing sausage more effective by arranging, counting and putting the correct number of sausages of the same diameter into compartments in a packing machine 2. In this way one to four persons per installation can be made available. In addition very small space is required, which makes it adaptable also to small butchers' shops. Still an advantage is that it can be disconnected from a stationary packing machine 2, so that this also can be used to pack other objects than sausage.

The invention is however not limited to the above stated and the embodiment shown in the drawings, but can be varied within the scope of the patent claims without departing from the inventive concept.

I claim:

1. A device for handling of sausage between a sausage feeder and a delivering device for sausage to a package by a conveyor acting between the feeder and the device comprising:

a carrier conveyor with transverse walls and a plurality of sausage receiving compartments;

a first receiving part cooperative with and operating beneath the carrier conveyor;

a second receiving part which regulates the number of sausages delivered to a package part by its lateral movement along a substantially horizontal plane for delivery of the sausage to an intended package part and which is cooperative and beneath the first receiving part;

a plurality of sunken box units operating sausage receiving parts having a bottom which can be opened and which is cooperative with and beneath the second receiving part; and a plurality of intended package parts situated below and corresponding with a sunken box operating sausage receiving part.

2. Device according to claim 1, characterized in that the transverse sausage compartment dividing walls of the carrier conveyor extending to an active height below the diameter of a sausage and a sausage depository ends in the area above said carrier conveyor.

3. Device according to claim 1, characterized in that the sunken box is movable laterally preferably pivotally journalled between a receiving position and a delivering position.

4. A device for handling of sausage between a sausage feeder and a delivering device for sausage to a package by a conveyor acting between the feeder and the device comprising:

a substantially linear series of flaps;

an upwards inclined sorting conveyor located below the series of flaps;

a plurality of carriers dividing the upwards inclined sorting conveyor;

a multiplicity of compartments formed on the upwards inclined sorting conveyor by the plurality of carriers into which sausages are actuated before delivery to a package;

a carrier conveyor with transverse walls and a plurality of sausage receiving compartments;

a first receiving part cooperative with and operating beneath the carrier conveyor; and a second receiving part which regulates the number of sausages delivered to a package part by its lateral movement along a substantially horizontal plane for delivery of the sausage to an intended package part and which is cooperative and beneath the first receiving part.

5. Device according to claim 4, characterized in that the transverse sausage compartment dividing walls of the carrier conveyor extending to an active height below the diameter of a sausage and a sausage depository ends in the area above said carrier conveyor.

6. Device according to claim 4, characterized in that the sunken box is movable laterally preferably pivotally journalled between a receiving position and a delivering position.

* * * * *